United States Patent [19]
Hamstra

[11] 3,903,395
[45] Sept. 2, 1975

[54] TEMPERATURE CONTROL SYSTEM
[75] Inventor: David C. Hamstra, Clinton, Iowa
[73] Assignee: General Electric Company, Fort Wayne, Ind.
[22] Filed: June 12, 1974
[21] Appl. No.: 478,700

[52] U.S. Cl. ............... 219/497; 219/494; 219/501; 219/507
[51] Int. Cl. ............................................ H05b 1/02
[58] Field of Search ........... 219/480, 483, 486, 494, 219/497, 499, 501, 504, 505, 506; 323/75 H; 165/11; 128/359; 236/65

[56] References Cited
UNITED STATES PATENTS
| | | | |
|---|---|---|---|
| 3,548,185 | 12/1970 | Rabindran | 219/497 |
| 3,553,429 | 1/1971 | Nelson | 219/497 |
| 3,616,846 | 11/1971 | Wills | 165/26 |

Primary Examiner—J. D. Miller
Assistant Examiner—Fred E. Bell
Attorney, Agent, or Firm—Joseph E. Papin

[57] ABSTRACT

A temperature control system having an electric heating device selectively energizable by way of a gate controlled semiconductor switch according to indications from a temperature sensing element. The system employs an integrated monolithic semiconductor circuit having a plurality of differential amplifiers therein, each of which receives a temperature indicative signal and a reference signal for either high, low or preferred temperature, and the differential amplifier outputs are used to control the heating element energization as well as to enable or disable high and low temperature indicators. A lockout function is derived from the high temperature indication to prevent the enabling of the heating element when a predetermined maximum temperature has been exceeded.

17 Claims, 3 Drawing Figures

TEMPERATURE CONTROL SYSTEM

BACKGROUND OF THE INVENTION

The present invention relates generally to temperature control systems and in particular to a temperature control system having a temperature sensing element which provides a plurality of control and/or indication functions.

In the past, the desirability of providing solid state thermostatic control systems has been recognized, and electric heating elements have been selectively energized by way of silicon controlled switches according to information derived from temperature sensitive devices, such as thermistors. Such past systems, of course, eliminate some of the problems associated with the contacts and moving parts of the more classic thermostatic control systems. More complicated or sophisticated electronic temperature control systems have also been devised with recording and alarm provisions. However, these more sophisticated systems are costly, complex and have not received a general acceptance and wide application due to their complex and costly nature.

It is one object of the present invention to provide a multiple function temperature control system characterized by its simplicity and economy of manufacture.

Another object of the present invention is to provide a temperature control system employing integrated monolithic semiconductor circuitry.

A further object of the present invention is to provide a system for controlling a temperature including a low temperature warning and a high temperature shut-off feature.

SUMMARY OF THE INVENTION

The foregoing, as well as numerous other objects and advantages of the present invention, may be achieved by providing a heating means coupled by way of a semiconductor switch to a source of electrical energy and selectively energizing that switch in accordance with a signal from an integrated circuit. A thermistor or other temperature sensitive device provides input information to the integrated circuit along with reference signals corresponding to high, low and preferred temperature. The integrated circuit includes differential amplifiers each responsive to the actual temperature information and each having a reference signal to control the semiconductor switch and to provide indications if the temperature exceeds or falls below prescribed maximum and minimum values. A lockout provision may also be incorporated in the integrated circuit to disable the semiconductor switch in the event that the maximum temperature is exceeded.

In general, a temperature control system in one form of the invention has first means for providing an electrical indication of a temperature being monitored. A plurality of electrical reference sources includes one source for providing an electrical reference corresponding to a preferred temperature, and another source for providing an electrical reference corresponding to a limiting temperature. A plurality of second means is responsive to the first means and to one of the one and other sources for providing an output electrical indication corresponding to the difference between the electrical indication of temperature and the electrical reference. A plurality of switch means is coupled to one of said second means and responsive to the output electrical indication thereof to switch between its conducting and non-conducting states, one of the switch means being adapted to control a device for changing the temperature being monitored and another of the switch means being adapted to control a limiting temperature indicator.

Also in general and in one form of the invention, a temperature control system has first means for providing an electrical indication of a temperature being monitored; second means for providing an electrical reference corresponding to a preferred temperature; the third means responsive to the first and second means for providing as an output an electrical indication corresponding to the difference between the monitored temperature and the preferred temperature. Electrically energizable heating means is provided for raising the monitored temperature, and a gate controlled semiconductor switch selectively couples the heating means to a source of electrical energy. Means is provided for coupling the output of the third means to the semiconductor switch gate to render the switch conoductive only when the monitored tempeprature is less than the preferred temperature. Fourth means provides an electrical reference corresponding to a preselected temperature limit, and fifth means is responsive to the first and fourth means for providing as an output an electrical indication corresponding to the difference between the monitored temperature and the temperature limit. Controlled means is also provided, and switch means is responsive to the output of the fifth means for selectively energizing the controlled means.

Further in general, a temperature control system in one form of the invention has an electrically energizable heating means and semiconductor switch means for selectively coupling the heating means to a source of electrical energy. The temperature control system also has means for providing an electrical indication of a temperature being monitored; means for providing an electrical reference corresponding to a preferred temperature; and means for providing an electrical reference corresponding to a maximum allowable temperature. Integrated circuit means is responsive to each of the electrical references for enabling the switch means when the monitored temperature is less than the preferred temperature, disabling the switch means when the monitored temperature exceeds the preferred temperature, and locking the switch means in the disabled state when the monitored temperature exceeds the maximum allowable temperature.

The subject matter which I regard as my invention is particularly pointed out and distinctly claimed in the concluding portion of the specification. My invention itself, however, together with further objects and advantages thereof, may best be understood by reference to the following description taken in conjunction with the accompanying drawing.

BRIEF DESCRIPTION OF THE DRAWING

Corresponding reference characters indicate corresponding parts throughout the several views of the drawings.

The following examples illustrate the invention and are not to be construed as limiting in any manner.

DESCRIPTION OF THE PREFERRED EMBODIMENT

Figure 1:
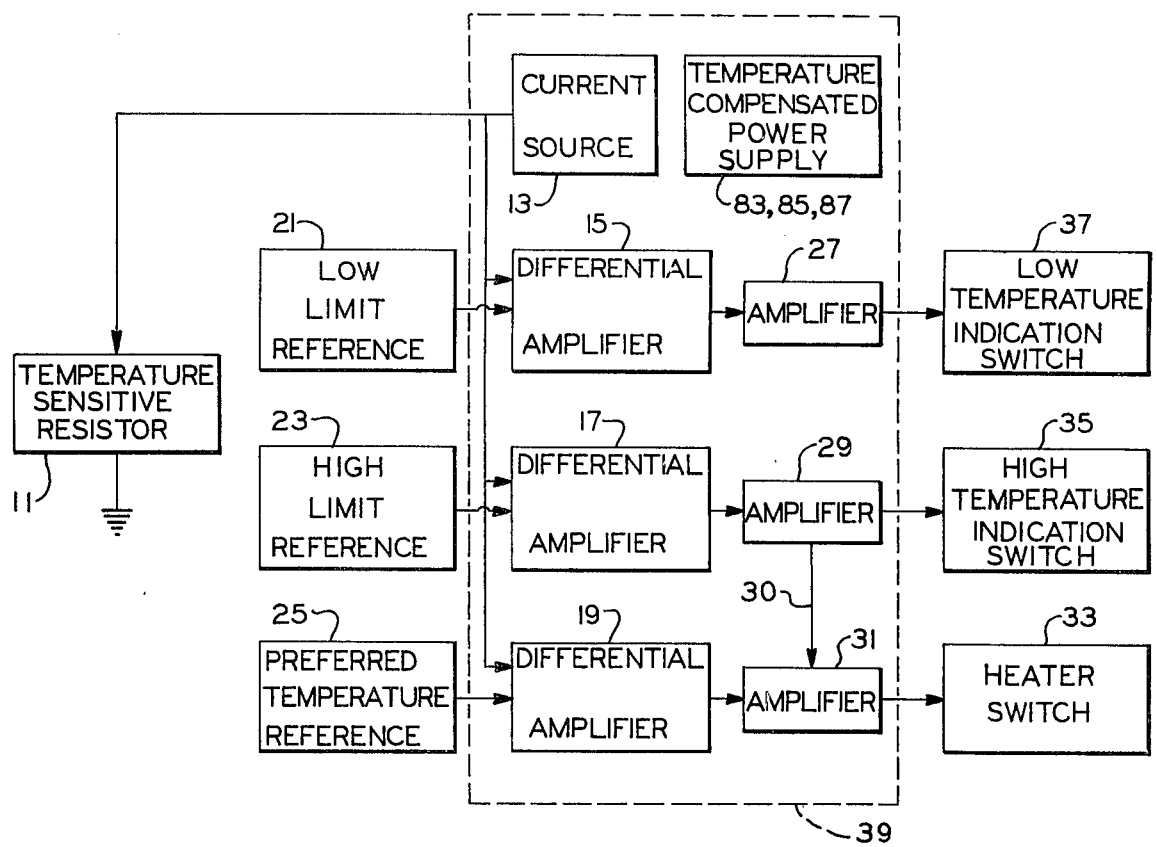
FIG. 1 is a functional block diagram of an exemplary control system.

Referring now to FIG. 1 of the drawings in detail, an exemplary implementation of the present invention derives an electrical indication of a temperature being monitored by sensing the voltage across a temperature sensitive resistor of thermistor 11 which is provided with a constant current flow from a current source 13. Temperature sensitive resistor 11 may have a negative temperature coefficient so that when the temperature sensed increases, the resistance decreases, and since there is a constant current flow through the resistor the voltage sensed also decreases. Thus, the voltage across temperature sensing resistor 11 varies generally inversely with temperature. It is contemplated that a temperature sensing resistor having a positive temperature coefficient may also be utilized within the scope of the invention. This sensed voltage is supplied as one input to each of three differential amplifiers 15, 17, 19. Differential amplifiers 15, 17, 19 receive, as their other individual inputs, reference electrical indications which, for example, may include: a low temperature reference voltage source 21; a high temperature limit reference voltage source 23; and a preferred temperature reference voltage source 25 which may be operator variable within the range between the high and low limit references.

Figure 2A:
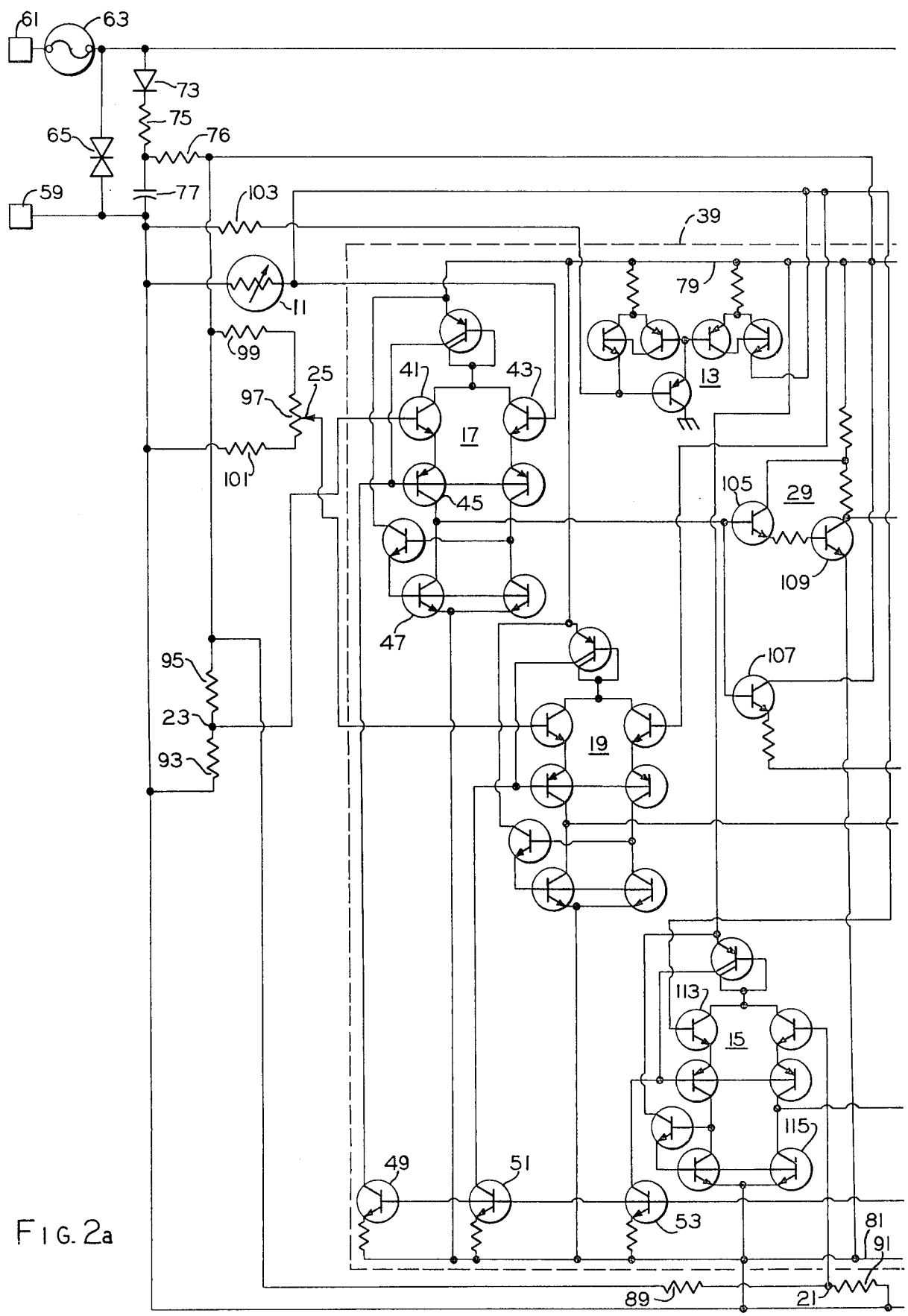
FIGS. 2a and 2b, when joined together, illustrate in detailed schematic form the system of FIG. 1.
Figure 2B:
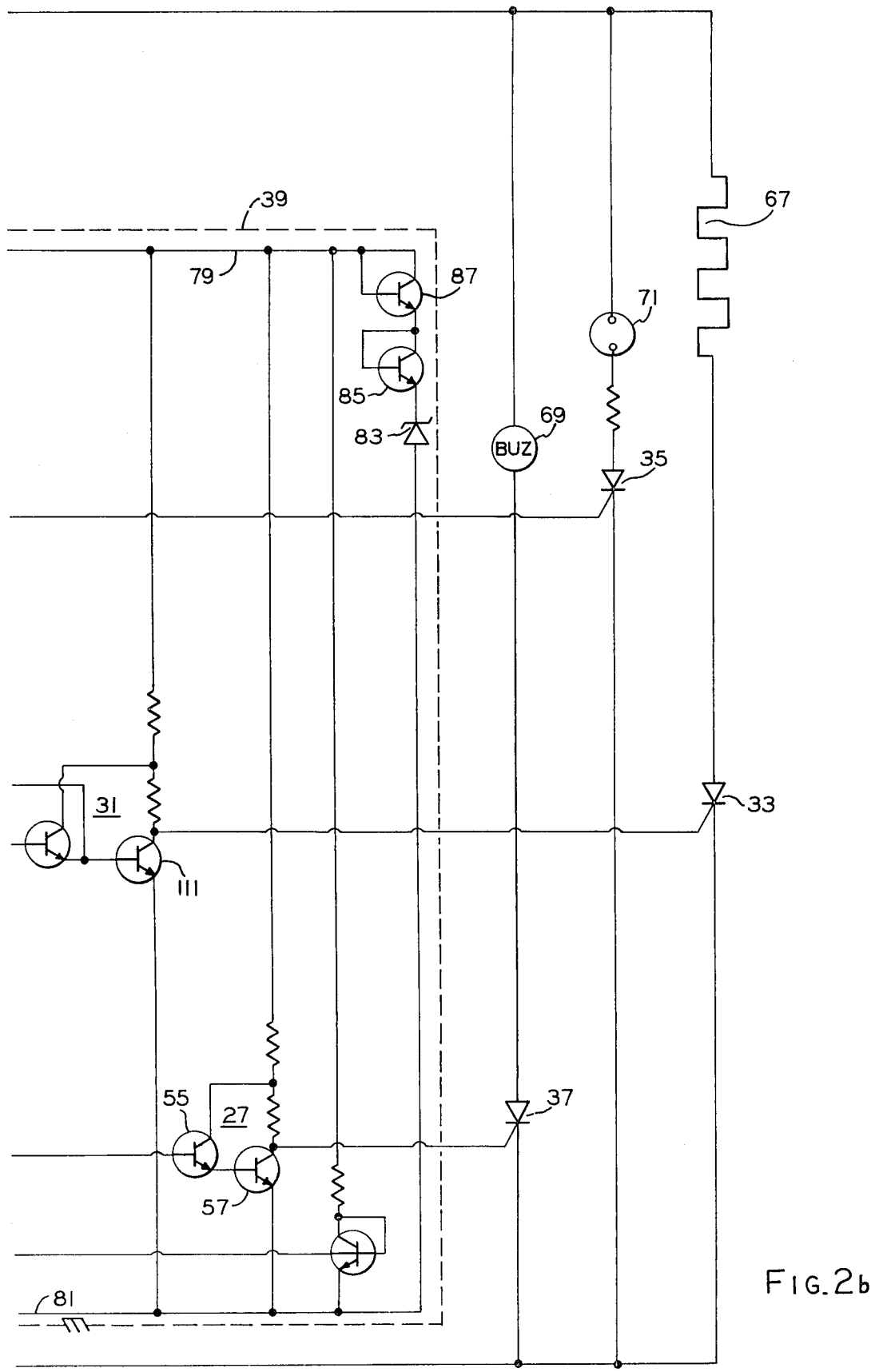

Each of differential amplifiers 15, 17, 19 functions to amplify the difference between its two input signals and supply that difference representing signal to other or further amplifiers or amplification stages 27, 29 and 31. Further amplifier stages 27, 29, 31 are employed to control, for example, silicone gate controlled semiconductor switches, such as those indicated at 33, 35, 37. Gate controlled semiconductor or heater switch 33, for example, would function to couple an electrical heating element to a source of electrical energy while gate controlled semiconductor or high temperature switch 35 may provide an alarm indication or, as in the embodiment in FIG. 2, may provide that indication by extinguishing a monitor lamp which when lit indicates normal operation. Gate controlled semiconductor or low temperature switch 37 may function to couple an audible alarm device to a source of electrical energy. As depicted in FIG. 1, current source 13, differential amplifiers 15, 17, 19, and further amplification stages 27, 29 and 31 are all part of an integrated monolithic semiconductor circuit as indicated by the dotted enclosing line 39. This integrated circuit structure is enclosed within the same dotted line 39 in the more detailed schematic diagram of FIGS. 2a and 2b in which other like reference numerals identify the same or similar structures.

Referring now to FIGS. 1a and 1b, differential amplifiers 15, 17, 19 comprise two branches of alternate NPN, PNP and NPN transistors. For example, as seen in differential amplifier 17, the two inputs are supplied to the bases of a pair of transistors 41, 43, and the output is derived from the common collector connection between a pair of transistors 45, 47. A transistor 49 acts as a constant current source for differential amplifier 17, and a pair of transistors 51, 53 similarly supply a constant current flow to differential amplifiers 19, 15, respectively. Amplifiers 27, 29, 31, which receive the output from respective differential amplifiers 15, 17, 19, are seen to comprise a pair of transistors, such as those indicated at 55, 57 and connected in a Darlington configuration to insure that the second transistor in the pair is either cut off or nearly saturated thereby to effect a good switching signal to the gates of respective gate controlled semiconductor switches 33, 35, 37.

A source of electrical energy is provided at a pair of terminals 59, 61 which may be, for example, a 120V 60 cycle alternating current. A thermal fuse 63 may be provided, and a thyrector 65 is included to prevent sudden surges of transients from causing damage to the system. The alternating current of the supply at terminals 59, 61 is applied on alternate half cycles directly across a resistance heating element 67 by way of gate controlled semiconductor switch 33, and similarly the half wave AC voltage is applied across a controlled means, such as an audible alarm or buzzer 69, and another controlled means, such as a visible indicator or lamp 71, by way of their respective gate controlled semiconductor switches 37, 35, respectively. It is contemplated that a relay or the like may constitute the controlled means instead of buzzer 69 and lamp 71 to initiate an external function for controlling operation of another device within the scope of this invention. Direct current voltage for the remaining portions of the system is provided by a rectifying diode 73 which, by way of a current limiting resistor 75, maintains the direct current charge on a capacitor 77. The direct current voltage is applied across an integrated circuit board positive supply line 79 and an integrated circuit board common or ground line 81, and this voltage is maintained relatively constant by a Zener diode 83 connected in a series with a pair of diode connected transistors 85, 87 which provide temperature compensation to this regulated voltage. A resistor 76 is provided as a voltage dropping resistor for Zener diode 83.

Electrical references or indications are derived by resistive voltage divider circuits across the regulated voltage with low limit reference 21 being obtained between a pair of resistors 89, 91, the high limit reference 23 being obtained at the junction between a pair of resistors 93, 95, and the variable preferred temperature reference being obtained from wiper arm 25 of variable resistor 97 which may be in series with a pair of upper limit and lower limit resistors 99, 101, respectively. Resistor 103, which is also external to the integrated circuitchip, may be made variable to vary the current from constant current source 13 through temperature sensitive resistor 11.

The output of exemplary differential amplifier 17 which, of course, functions as a comparator is taken from the collector of transistor 45 and applied to the base of a first transistor 105 of the Darlington pair in amplifier 29. In normal operation, gate controlled semiconductor switch 35 will be conducting so that a panel indicator lamp 71 is illuminated, and gate controlled semiconductor switch 37 will be non-conducting indicating no abnormally low temperature. Gate controlled semiconductor switch 33 will be intermittently conducting energizing heating element 67 for the appropriate portions of half waves to maintain the desired temperature. If for some reason the temperature should rise and exceed the high limit, the potential at the base of transistor 43 decreases raising the potential on the output line at the collector of transistor 45 thereby to cause transistor 105 to conduct more current which, in turn, causes transistor 109 to saturate lowering the potential at the gate of gate controlled semiconductor switch 33 to ground and shutting off that switch. At the same time the increase of the potential at the collector of transistor 45 causes a transistor 107 to increase its conduction similarly increasing the conduction of a transistor 111 to saturation thereby to lower the potential at the gate of switch 33 shutting off entirely the energy supply to heating element 67. Thus, transistor 107 performs a locking function, as illustrated by line 30 in FIG. 1. It will be recognized that line 30 could be brought to the outside of line 39, thus being outside of the integrated circuit, whereby the locking function could be disabled, if desired.

In a similar manner, but without this locking provision, a substantial decrease in the monitored temperature causes the voltage at the gate of a transistor 113 in differential amplifier 15 to increase so that the voltage level on the collector of a transistor 115 decreases lowering the base-to-emitter bias on transistor 55 thereby substantially turning off transistor 57 which, in turn, raises the potential at the gate of gate controlled semiconductor switch 37 causing that switch to conduct and energize audible alarm 69.

An exemplary environment for the temperature control system of the present invention may be, for instance, a water mattress, such as may be found in a hospital, where the low temperature limit at junction 21 may, for example, be set at 90° F. whereas the high temperature limit, as determined by the potential at junction 23, may be 100° F. Within this temperature range, potentiometer 97 may, for example, be adjustable throughout the range of 93° to 98°F., and temperature control to within one-half degree is possible. Of course, the present invention is intended for use in many other environments.

Thus, while the present invention has been described with respect to a specific embodiment, numerous modifications will suggest themselves to those of ordinary skill in the art. The temperature control circuit is applicable to a wide range of temperature control environments. While a high temperature locking provision has been disclosed in conjunction with a normal operation indicator, such as lamp 71, numerous variations of locking and energizing or not energizing high and low indicators are possible. Different types of differential amplifiers or comparators could be employed, and while simple silicon controlled switches have been disclosed, bi-directional devices, such as a "Triac," might be preferred in some situations. While three functions have been disclosed, a larger number is also possible. Also in some situations a positive temperature coefficient temperature sensitive device might be preferred. These and numerous other modifications will readily suggest themselves to those of ordinary skill in the art, and accordingly, the scope of the present invention is to be measured by the claims which follow.

What I claim as new and desire to secure by Letters Patent of the United States is:

1. A temperature control system comprising first means for providing an electrical indication of a temperature being monitored, a plurality of electrical reference sources including one source for providing an electrical reference corresponding to a preferred temperature, and another source for providing an electrical reference corresponding to a limiting temperature, a plurality of second means each responsive to the first means and to one of the one and other sources for providing an output electrical indication corresponding to the difference between the electrical indication of temperature and the electrical reference, and a plurality of switch means each coupled to one of said second means and responsive to the output electrical indication thereof to switch between its conducting and non-conducting states, one of the switch means being adapted to control a device for changing the temperature being monitored and another of the switch means being adapted to control a limiting temperature indicator.

2. A temperature control system as set forth in claim 1, wherein the first means comprises a temperature sensitive resistor and a constant current source in series, the electrical indication being the voltage across the temperature sensitive resistor which voltage varies generally with temperature.

3. A temperature control system as set forth in claim 1, further comprising means for rendering the one switch means non-conducting when the temperature being monitored exceeds a predetermined maximum value.

4. A temperature control system as set forth in claim 1, wherein the second means are all formed as part of an integrated monolithic semiconductor circuit with each of the second means generally constituting a differential amplifier.

5. A temperature control system as set forth in claim 3, further comprising electrically energizable heating means for raising the monitored temperature, the limiting temperature indicator comprising an indicator energized by way of the other switch means.

6. A temperature control system as set forth in claim 1, wherein the limiting temperature is a predetermined minimum temperature, the limiting temperature indicator comprising a warning device selectively coupled to a source of electrical energy by the other switch means.

7. A temperature control system as set forth in claim 1, wherein the plurality of reference sources include a further source for providing an electrical indication corresponding to a second limiting temperature, one of the limiting temperatures being a predetermined maximum temperature and the other of the limiting temperatures being a predetermined minimum temperature, and means for rendering the one switch means non-conducting when the temperature being monitored exceeds a predetermined maximum value.

8. A temperature control system comprising first means for providing an electrical indication of a temperature being monitored, second means for providing an electrical reference corresponding to a preferred temperature, third means responsive to the first and second means for providing as an output an electrical indication corresponding to the difference between the monitored temperature and the preferred temperature, electrically energizable heating means for raising the monitored temperature, a gate controlled semiconductor switch for selectively coupling the heating means to a source of electrical energy, means for coupling the output of the third means to the semiconductor switch gate to render the switch conductive only when the monitored temperature is less than the preferred temperature, fourth means for providing an electrical reference corresponding to a preselected temperature limit, fifth means responsive to the first and fourth means for providing as an output an electrical indication corresponding to the difference between the monitored temperature and the temperature limit, controlled means, and switch means responsive to the output of the fifth means for selectively energizing the controlled means.

9. A temperature control system as set forth in claim 8, wherein the first means comprises a temperature sensitive resistor and a constant current source in series, the electrical indication being the voltage across the temperature sensitive resistor.

10. A temperature control system as set forth in claim 8, further comprising means for rendering the semiconductor switch non-conducting when the temperature being monitored exceeds a predetermined maximum value.

11. A temperature control system as set forth in claim 10, wherein the third means, the coupling means for, and the fifth means are formed as part of an integrated monolithic semiconductor circuit with the third and fifth means comprising differential amplifiers, the controlled means comprising an indicator energized by way of a further gate controlled semiconductor switch which is rendered conductive by said fifth means.

12. A temperature control system as set forth in claim 8, wherein the temperature limit is a predetermined minimum temperature, the controlled means comprising a warning device coupled to a source of electrical energy when the monitored temperature is less than the preselected temperature limit.

13. A temperature control system as set forth in claim 8, further comprising sixth means for providing an electrical indication corresponding to another preselected temperature limit, seventh means responsive to the first and sixth meaans for providing as an output an electrical indication corresponding to the difference between the monitored temperature and the another temperature limit, other controlled means, means responsive to the output of the seventh means for selectively energizing the other controlled means, one of the said temperature limits being a maximum temperature, and means for disabling the gate controlled semiconductor switch when the monitored temperature exceeds the maximum temperature.

14. A temperature control system comprising an electrically energizable heating means, semiconductor switch means for selectively coupling the heating means to a source of electrical energy, means for providing an electrical indication of a temperature being monitored, means for providing an electrical reference corresponding to a preferred temperature, means for providing an electrical reference corresponding to a maximum allowable temperature, and integrated circuit means responsive to each of the electrical references for enabling the switch means when the monitored temperature is less than the preferred temperature, disabling the switch means when the monitored temperature exceeds the preferred temperature, and locking the switch means in the disabled state when the monitored temperature exceeds the maximum allowable temperature.

15. A temperature control system as set forth in claim 14, further comprising means for providing an electrical reference corresponding to a minimum allowable temperature, controlled means, and semiconductor switch means for selectively coupling the controlled means to a source of electrical energy, the integrated circuit means including means for enabling the last named switch means when the monitored temperature is less than the minimum allowable temperature.

16. A temperature control system as set forth in claim 15, further comprising other controlled means and semiconductor switch means for coupling the other controlled means to a source of electrical energy, the integrated circuit means including means for disabling the switch means for the other controlled means when the semiconductor switch means for the heating means is locked in the disabled state.

17. A temperature control system as set forth in claim 14, wherein the monitored temperature indication means comprises a temperature sensitive resistor and a constant current source in series, the electrical indication being the voltage across the temperature sensitive resistor which voltage varies generally with temperature.

* * * * *